US012625607B2

(12) United States Patent (10) Patent No.: US 12,625,607 B2
Guan et al. (45) Date of Patent: May 12, 2026

(54) DISPLAY CONTROL METHOD, DISPLAY CONTROL SYSTEM AND DISPLAY TERMINAL

(71) Applicant: BOE Technology Group Co., Ltd., Beijing (CN)

(72) Inventors: Enhui Guan, Beijing (CN); Youxiang Xia, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 305 days.

(21) Appl. No.: 18/282,229

(22) PCT Filed: Feb. 22, 2023

(86) PCT No.: PCT/CN2023/077701
§ 371 (c)(1),
(2) Date: Sep. 15, 2023

(87) PCT Pub. No.: WO2023/179285
PCT Pub. Date: Sep. 28, 2023

(65) Prior Publication Data
US 2025/0036278 A1 Jan. 30, 2025

(30) Foreign Application Priority Data
Mar. 21, 2022 (CN) ......................... 202210276922.X

(51) Int. Cl.
G06F 3/04886 (2022.01)
(52) U.S. Cl.
CPC .................... G06F 3/04886 (2013.01); G06F 2203/04803 (2013.01)

(58) Field of Classification Search
CPC ....................... G06F 3/04886; G06F 2203/048
See application file for complete search history.

(56) References Cited

U.S. PATENT DOCUMENTS 9,626,146 B2 * 4/2017 Song ..................... G06F 3/1454
2013/0241954 A1 * 9/2013 Yu ......................... G06F 3/1446
345/1.3
(Continued)

FOREIGN PATENT DOCUMENTS

CN 102750067 A 10/2012
CN 102855867 A 1/2013
(Continued)

OTHER PUBLICATIONS

International Search Report for PCT/CN2023/077701 Mailed May 15, 2023.
(Continued)

*Primary Examiner* — Rodney Amadiz
(74) *Attorney, Agent, or Firm* — Ling Wu; Stephen Yang; Ling and Yang Intellectual Property

(57) ABSTRACT

A display control method, including: acquiring at least one of a size of a first screen and a first resolution of a first display terminal and at least one of a size of a second screen and a second resolution of a second display terminal; determining a screen partition result of the first display terminal according to at least one of the size of the first screen and the first resolution, and at least one of the size of the second screen and the second resolution; wherein the size of the first screen is larger than the size of the second screen, and the first resolution is greater than or equal to the second resolution.

17 Claims, 7 Drawing Sheets

Acquiring at least one of a size of a first screen and a first resolution of the first display terminal, and at least one of a size of a second screen and a second resolution of the second display terminal 21

Determining a screen partition result of the first display terminal according to at least one of the size of the first screen and the first resolution, and at least one of the size of the second screen and the second resolution 22

(56)                    References Cited

U.S. PATENT DOCUMENTS

| | | | |
|---|---|---|---|
| 2015/0138121 A1 | 5/2015 | Koenig et al. | |
| 2016/0291919 A1* | 10/2016 | Kurota ................. | H04N 9/3147 |
| 2017/0134635 A1 | 5/2017 | Cho et al. | |
| 2019/0250759 A1 | 8/2019 | Chung | |
| 2020/0057595 A1 | 2/2020 | Wu et al. | |
| 2020/0249900 A1* | 8/2020 | Oh ................... | H04N 21/43635 |
| 2022/0319390 A1* | 10/2022 | Zhang ................... | G06F 3/1446 |

FOREIGN PATENT DOCUMENTS

| CN | 102981793 A | 3/2013 |
|---|---|---|
| CN | 104331243 A | 2/2015 |
| CN | 104657070 A | 5/2015 |
| CN | 107093418 A | 8/2017 |
| CN | 107506163 A | 12/2017 |
| CN | 108399039 A | 8/2018 |
| CN | 109343925 A | 2/2019 |
| CN | 109901761 A | 6/2019 |
| CN | 110036363 A | 7/2019 |
| CN | 111314441 A | 6/2020 |
| CN | 111586237 A | 8/2020 |
| CN | 111880676 A | 11/2020 |
| CN | 113010130 A | 6/2021 |
| CN | 113485626 A | 10/2021 |
| CN | 113918070 A | 1/2022 |
| CN | 114756186 A | 7/2022 |
| JP | 2012150702 A | 8/2012 |

OTHER PUBLICATIONS

Office Action dated Jan. 15, 2025 for CN202210276922X and English Translation.

* cited by examiner

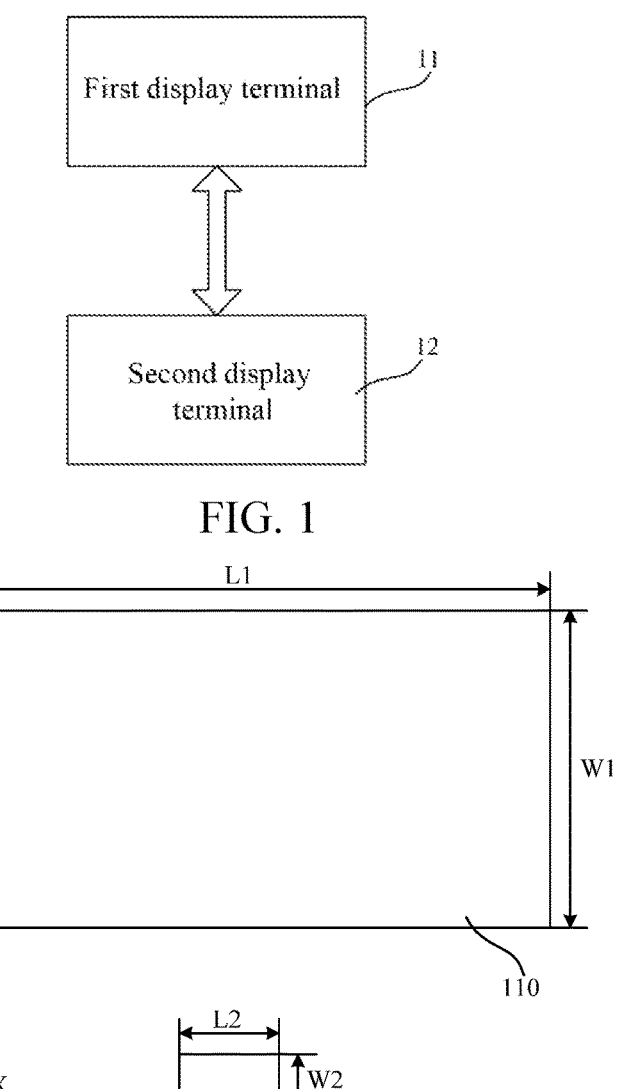

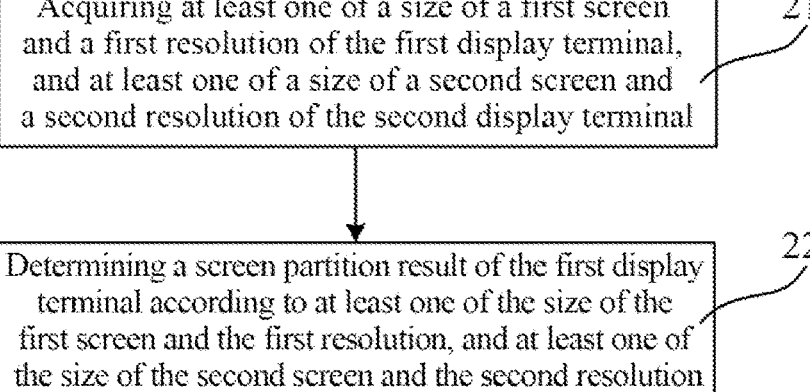

Acquiring at least one of a size of a first screen and a first resolution of the first display terminal, and at least one of a size of a second screen and a second resolution of the second display terminal Determining a screen partition result of the first display terminal according to at least one of the size of the first screen and the first resolution, and at least one of the size of the second screen and the second resolution

FIG. 3

DISPLAY CONTROL METHOD, DISPLAY CONTROL SYSTEM AND DISPLAY TERMINAL

CROSS-REFERENCE TO RELATED APPLICATION

This application is a national stage application of PCT Application No. PCT/CN2023/077701, which is filed on Feb. 22, 2023 and claims the priority of Chinese patent application No. 202210276922.X, filed to the CNIPA on Mar. 21, 2022 and entitled "Display Control Method, Display Control System and Display Terminal", the content of which should be regarded as being incorporated herein by reference.

TECHNICAL FIELD

The present invention relates to, but is not limited to, the field of display technology, in particular to a display control method, a display control system and a display terminal.

BACKGROUND

Large screen display apparatuses (for example, display apparatuses with screen size greater than or equal to 40 inches) appear more frequently in modern public places such as office and conference, and their applications become more extensive. For example, large screen displays and conference projection display apparatuses are typical large screens. However, at present, the interactive modes for large screen display apparatuses are not rich enough. The most common interactive devices are mainly mice, keyboards and other devices, or large screen display apparatuses integrate touch function. However, due to the large size of large screen display apparatuses, it is inconvenient to control them by mouse or touch.

SUMMARY

The following is a summary of subject matter described herein in detail. The summary is not intended to limit the protection scope of claims.

An embodiment of the present disclosure provides a display control method, a display control system and a display terminal.

In a first aspect, an embodiment of the present disclosure provides a display control method, including: acquiring at least one of a size of a first screen and a first resolution of a first display terminal and at least one of a size of a second screen and a second resolution of a second display terminal; and determining a screen partition result of the first display terminal according to at least one of the size of the first screen and the first resolution, and at least one of the size of the second screen and the second resolution. The size of the first screen is larger than the size of the second screen, and the first resolution is greater than or equal to the second resolution.

In some exemplary embodiments, the screen partition result of the first display terminal includes: a number of first partitions along a first direction and a number of second partitions along a second direction of the first display terminal; and the first direction intersects the second direction.

In some exemplary embodiments, the determining of a screen partition result of the first display terminal according to at least one of the size of the first screen and the first resolution, and at least one of the size of the second screen and the second resolution includes: determining a first parameter and a second parameter according to the size of the first screen and the size of the second screen, wherein the first parameter is used to reflect the screen size ratio of the first display terminal and the second display terminal in the first direction, and the second parameter is used to reflect the screen size ratio of the first display terminal and the second display terminal in the second direction; determining a third parameter and a fourth parameter according to the first resolution and the second resolution, wherein the third parameter is used to reflect the pixel ratio of the first display terminal and the second display terminal in the first direction, and the fourth parameter is used to reflect the pixel ratio of the first display terminal and the second display terminal in the second direction; determining a first partition parameter of the first display terminal according to the first parameter and the third parameter; determining a second partition parameter of the first display terminal according to the second parameter and the fourth parameter; and determining a first partition number and a second partition number according to the first partition parameter and the second partition parameter.

In some exemplary embodiments, the value of the first partition parameter is the smaller of the first parameter and the third parameter, and the value of the second partition parameter is the smaller of the second parameter and the fourth parameter.

In some exemplary embodiments, the determining of a first partition number and a second partition number according to the first partition parameter and the second partition parameter includes: when the first partition parameter is greater than or equal to 2, determining the first partition number by using the first partition parameter; when the first partition parameter is less than 2, determining the first partition number as a first set value; when the second partition parameter is greater than or equal to 2, determining the second partition number by using the second partition parameter; and when the second partition parameter is less than 2, determining the second partition number as a second set value.

In some exemplary embodiments, the determining of the first partition number using the first partition parameter includes: calculating a sum of 1 and half of the first partition parameter to obtain the first partition number. The determining of the second partition number by using the second partition parameter includes: calculating the sum of 1 and half of the second partition parameter to obtain the second partition number.

In some exemplary embodiments, the first partition parameter is greater than or equal to 2, and the first partition number is greater than or equal to 2 and less than or equal to the first partition parameter; the second partition parameter is greater than or equal to 2, and the second partition number is greater than or equal to 2 and less than or equal to the second partition parameter.

In some exemplary embodiments, the display control method further includes: displaying the screen partition result at least one of the first display terminal and the second display terminal.

In some exemplary embodiments, the display control method further includes: updating the screen partition result according to input information detected at the first display terminal or the second display terminal.

In some exemplary embodiments, the display control method further includes: determining a selected target partition of the first display terminal from multiple partitions obtained from the screen partition result according to a partition selection operation detected at the first display terminal or the second display terminal, and displaying image data of the target partition at the second display terminal.

In some exemplary embodiments, at the first display terminal, the display mode of the target partition is different from the display mode of the unselected partition.

In some exemplary embodiments, the display control method further includes: taking a touch point of the detected partition touch operation as a datum reference point, determining a partition in which the datum reference point is located as a target partition among multiple partitions obtained from the screen partition result according to a location of the datum reference point on the first screen and a screen partition result of the first display terminal, and displaying image data of the target partition on the second display terminal.

In some exemplary embodiments, the display control method further includes: taking a touch point of the detected partition touch operation as a datum reference point, determining a target partition of the first screen according to a location of the datum reference point on the first screen and a size of a single partition obtained from the screen partition result; and displaying image data of the target partition at the second display terminal; wherein the size of the target partition is the same as the size of a single partition obtained according to the screen partition result.

In some exemplary embodiments, the screen partition result of the first display terminal includes: size and location information of a target partition; the display control method further includes displaying image data of the target partition at the second display terminal.

In some exemplary embodiments, the determining of a screen partition result of the first display terminal according to at least one of the size of the first screen and the first resolution, and at least one of the size of the second screen and the second resolution includes: taking the touch point of the detected partition touch operation as a datum reference point, determining the size and location information of the target partition according to the location of the datum reference point on the first screen, the size of the first screen and the size of the second screen; wherein the size of the target partition is greater than or equal to the size of the second screen.

In some exemplary embodiments, the display control method further includes: adjusting the size of the target partition according to at least one of a touch pressure and a touch duration of the partition touch operation.

On the other hand, an embodiment of the present disclosure provides a display control system including a first display terminal and a second display terminal. The first display terminal has a size of a first screen larger than a size of a second screen of the second display terminal, and the first display terminal has a first resolution greater than or equal to a second resolution of the second display terminal. Wherein the first display terminal or the second display terminal is configured to acquire at least one of a size of a first screen and a first resolution of the first display terminal and at least one of a size of a second screen and a second resolution of the second display terminal; and determining a screen partition result of the first display terminal according to at least one of the size of the first screen and the first resolution, and at least one of the size of the second screen and the second resolution.

In some exemplary embodiments, the first display terminal at least includes a first screen. The first display terminal is configured to display the screen partition result on the first screen in response to a first operation.

In some exemplary embodiments, the second display terminal at least includes a second screen. The first display terminal is configured to determine a selected target partition in response to a second operation for the screen partition result and transmit display image data of the target partition to the second display terminal. The second display terminal is configured to synchronously display image data of the target partition through the second screen.

In some exemplary embodiments, the first display terminal at least includes a first screen and multiple sensors disposed around the first screen. the first display terminal is configured to detect a touch point of a partition touch operation through the multiple sensors, take the touch point as a datum reference point, determine the size and location information of a target partition according to the location of the datum reference point on the first screen, the size of the first screen and the size of the second screen, and transmit the image data of the target partition to the second display terminal. Wherein, the size of the target partition is greater than or equal to the size of the second screen. Alternatively, the first display terminal is configured to use a touch point of a partition touch operation detected by the multiple sensors as a datum reference point, determine a target partition of the first screen according to a location of the datum reference point on the first screen and a size of a single partition obtained according to the screen partition result, and transmit image data of the target partition to the second display terminal, wherein the size of the target partition is the same as the size of a single partition obtained according to the screen partition result.

In some exemplary embodiments, the first display terminal is further configured to adjust the size of the target partition according to at least one of a touch duration and a touch pressure of the partition touch operation.

In another aspect, an embodiment of the present disclosure provides a first display terminal including: a first screen, a first memory and a first processor, the first screen is coupled to the first processor, the first memory is adapted to store a computer program that, when executed by the first processor, implements the steps of the display control method described above.

In another aspect, an embodiment of the present disclosure provides a second display terminal including: a second screen, a second memory and a second processor, the second screen is coupled to the second processor, the second memory is adapted to store a computer program that, when executed by the second processor, implements the steps of the display control method described above.

In another aspect, an embodiment of the present disclosure provides a non-transitory computer readable storage medium, which stores a computer program. The steps of the display control method as described above are implemented when the computer program is performed.

In another aspect, the embodiment of the disclosure further provides a display control method, including: a first display terminal and a second display terminal establishing a connection; the first display terminal or the second display terminal automatically determining a screen partition result of the first display terminal according to at least one of a size of a first screen and a first resolution of the first display terminal and at least one of a size of a second screen and a second resolution of the second display terminal; and the first display terminal or the second display terminal presenting the screen partition result.

In some exemplary embodiments, the first display terminal or the second display terminal presenting the screen partition result may include: the first display terminal or the second display terminal presenting the screen partition result in a graphic mode, or presenting the screen partition result in a text mode.

Other aspects may be understood upon reading and understanding the drawings and detailed description.

BRIEF DESCRIPTION OF DRAWINGS

Accompanying drawings are used for providing further understanding of technical solutions of the present disclosure, constitute a part of the specification, and are used for explaining the technical solutions of the present disclosure together with the embodiments of the present disclosure, but do not constitute limitations on the technical solutions of the present disclosure. Shapes and sizes of one or more components in the drawings do not reflect actual scales, and are only intended to schematically describe contents of the present disclosure.

FIG. 1 is a schematic diagram of a display control system according to at least one embodiment of the present disclosure.

FIG. 2 is a schematic screen size diagram of a first display terminal and a second display terminal according to at least one embodiment of the present disclosure.

FIG. 3 is a schematic flowchart of a display control method according to at least one embodiment of the present disclosure.

DETAILED DESCRIPTION

Figure 4:
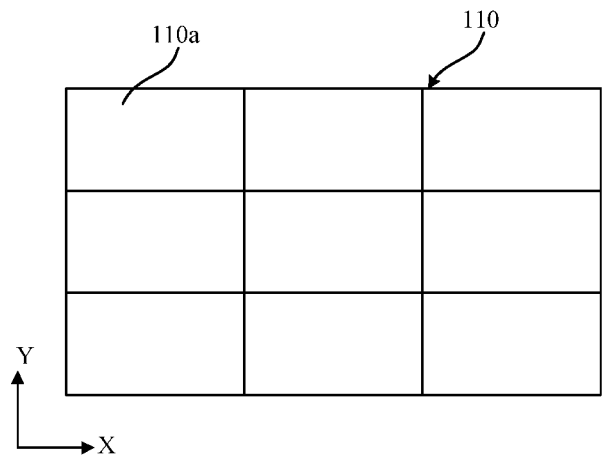
FIG. 4 is a schematic diagram of a screen partition result of a first display terminal according to at least one embodiment of the present disclosure.

Hereinafter embodiments of the present disclosure will be described in detail with reference to the accompanying drawings. Implementations may be implemented in multiple different forms. Those of ordinary skills in the art may easily understand such a fact that implementations and contents may be transformed into one or more forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the drawings, a size of one or more constituent elements, a thickness of a layer, or a region is sometimes exaggerated for clarity. Therefore, one implementation of the present disclosure is not necessarily limited to the dimensions, and shapes and sizes of multiple components in the accompanying drawings do not reflect actual scales. In addition, the drawings schematically illustrate ideal examples, and one implementation of the present disclosure is not limited to shapes, numerical values, or the like shown in the drawings.

Ordinal numerals such as "first", "second" and "third" in the present disclosure are set to avoid confusion between constituent elements, but not intended for restriction in quantity. "Multiple" in the present disclosure means a quantity of two or more.

In the present disclosure, for convenience, wordings "central", "up", "down", "front", "back", "vertical", "horizontal", "top", "bottom", "inside", "outside" and the like indicating orientation or locational relationships are used to illustrate locational relationships between constituent elements with reference to the drawings, which are only used to facilitate describing the present specification and simplify the description, rather than indicating or implying that involved apparatuses or elements must have specific orientations and be structured and operated in the specific orientations, and thus should not be understood as limitations on the present disclosure. The locational relationships between the constituent elements are changed as appropriate based on directions for describing the constituent elements. Therefore, appropriate replacements may be made according to situations without being limited to the wordings described in the specification.

In the present disclosure, unless otherwise specified and defined, terms "mounting", "mutual connection" and "connection" should be understood in a broad sense. For example, a connection may be a fixed connection, or a detachable connection, or an integrated connection. It may be a mechanical connection or an electrical connection. It may be a direct mutual connection, or an indirect connection through middleware, or an internal communication between two elements. Those of ordinary skills in the art may understand meanings of the above-mentioned terms in the present disclosure according to situations.

In some implementations, large screen display apparatuses are controlled by traditional interactive devices (e.g. mouse, keyboard, etc.). However, due to the large size of large screen display apparatuses, it is inconvenient for users to control large screen display apparatuses. Therefore, for the convenience of control, the display of the large screen display apparatus may be controlled by a small-sized touch screen independent of the large screen display apparatus. The content on the touch screen is displayed by compressing the content of the large screen display apparatus. Due to the problem of image compression, the content displayed by the small-sized touch screen is not fine enough, which makes the user have certain errors in operation and control. Moreover, it is difficult for users to interact directly with large screen display apparatuses, which reduces the use experience of users in the use scenario of large screen display apparatuses to a certain extent.

An embodiment provides a display control method and a display control system, which can achieve the intelligent operation of a large-size screen in the display control, thereby improving the use experience of a user.

FIG. 1 is a schematic diagram of a display control system according to at least one embodiment of the present disclosure. In some exemplary embodiments, as shown in FIG. 1 the display control system of the present embodiment may include a first display terminal 11 and a second display terminal 12. The first display terminal 11 may communicate with the second display terminal 12 in a wireless or wired manner. In some examples, the first display terminal 11 may establish a bidirectional wireless communication link with the second display terminal 12 via wireless routing or Bluetooth. In other examples, the first display terminal 11 may establish a communication link with the second display terminal through a transmission line such as a Universal Serial Bus (USB) or an I2C (Inter-Integrated Circuit) bus. However, this embodiment is not limited thereto.

In some exemplary embodiments, the first display terminal 11 may include at least a first screen having a size of a first screen and a first resolution. The second display terminal 12 may include at least a second screen having a size of a second screen and a second resolution. The size of the first screen may be larger than the size of the second screen. For example, the size of the first screen may be greater than 40 inches, for example, 110 inches; the size of the second screen may be less than 40 inches, and for example, it may be 10 inches. The first resolution may be greater than or equal to the second resolution. For example, the first resolution may be 8K and the second resolution may be 1080P. However, this embodiment is not limited thereto. For example, the first resolution may be equal to the second resolution.

In some exemplary embodiments, the first display terminal 11 may be a large screen display apparatus, for example, the first display terminal 11 may be a television device providing broadcast reception functions and computer support functions for digital television, network television, Internet Protocol television (IPTV), etc., or may be an exhibition display apparatus, etc. The first screen of the first display terminal 11 may be a liquid crystal display, an organic light emitting display or the like. However, this embodiment is not limited thereto.

In some exemplary embodiments, the second display terminal 12 may be a small screen display apparatus, for example, the second display terminal 12 may be a touch operation display apparatus, a mobile phone, a tablet computer, a laptop computer, etc. The second screen of the second display terminal 12 may be a liquid crystal display, an organic light emitting display, or the like. However, this embodiment is not limited thereto.

In some exemplary embodiments, after the first display terminal 11 and the second display terminal 12 establish a communication link, data communication may take place between the first display terminal 11 and the second display terminal 12. For example, the first display terminal 11 may transmit the displayed image data to the second display terminal 12, so that the second display terminal 12 synchronously displays the same image data as the first display terminal 11. As another example, the first display terminal 11 may read the size of the second screen and the second resolution from the second display terminal 12. As another example, the second display terminal 12 may read the size of the first screen and the first resolution from the first display terminal 11. In some examples, the first display terminal 11 and the second display terminal 12 may communicate through a Transmission Control Protocol (TCP). As another example, the first display terminal 11 and the second display terminal 12 may communicate through a User Datagram Protocol (UDP). As another example, the first display terminal 11 and the second display terminal 12 may communicate through a Real-time Transport Protocol (RTP). However, this embodiment is not limited thereto.

FIG. 2 is a schematic screen size diagram of a first display terminal and a second display terminal according to at least one embodiment of the present disclosure. In some exemplary embodiments, the first screen 110 of the first display terminal and the second screen 120 of the second display terminal may be identical, for example, both are rectangular. However, this embodiment is not limited thereto. For example, the first screen and the second screen may be of other shapes such as a pentagon a hexagon a circle or the like. As another example, the shapes of the first screen and the second screen may be different.

In some exemplary embodiments, as shown in FIG. 2, the size of the first screen of the first screen 110 of the first display terminal may be L1×W1, and the size of the second screen of the second screen 120 of the second display terminal may be L2×W2. Where L1 is the length of the first screen 110 in a first direction X, W1 is the length of the first screen 110 in a second direction Y, L2 is the length of the second screen 120 in the first direction X, and W2 is the length of the second screen 120 in the second direction Y. The first resolution of the first screen 110 may be A1×B1, and the second resolution of the second screen 120 may be A2×B2. The first direction X and the second direction Y are located in a same plane, and the first direction X intersects with the second direction Y, for example, the first direction X is perpendicular to the second direction Y.

In some exemplary embodiments, the pixel compression ratio of the first screen 110 and the second screen 120 is defined as N1=(A1×B1)/(A2×B2), and the screen size ratio of the first screen 110 and the second screen 120 is defined as N2=(L1×W1)/(L2×W2). In some implementations, with a size of a first screen of 110 inches (i.e., L1×W1=243.7 cm×137.1 cm), a first resolution of 8K (i.e., A1×B1=7680× 4320), a size of a second screen of 10 inches (i.e., L2×W2- 22.14 cm×12.45 cm) and a second resolution of 180P (i.e., A2×B2=1920×1080), N1 may be about 16 and N2 about 121. It may be seen that when the entire screen image of the first screen 110 is compressed and displayed on the second screen 120, there are problems in both image display effect and operation accuracy, which easily lead to operation and control errors, thereby affecting the user experience.

The display control method provided by the embodiment adopts intelligent processing to divide the area of the first screen to obtain a better screen partition result, which can improve the interaction efficiency between the user and the first display terminal and enhance the user experience. Furthermore, by dividing the first screen into regions and displaying image data of the selected partition on the second screen, the image compression ratio from the first screen to the second screen may be reduced, thereby improving the image display effect and operation accuracy of the second screen.

FIG. 3 is a schematic flowchart of a display control method according to at least one embodiment of the present disclosure. In some exemplary implementations, as shown in FIG. 3, the display control method of this embodiment may include the following steps:

Step 21, acquiring at least one of a size of a first screen and a first resolution of a first display terminal and at least one of a size of a second screen and a second resolution of a second display terminal;

Step 22, determining a screen partition result of the first display terminal according to at least one of the size of the first screen and the first resolution, and at least one of the size of the second screen and the second resolution;

In some exemplary embodiments, a size of a first screen of the first display terminal and a size of a second screen of the second display terminal may be acquired, and a screen partition result of the first display terminal may be determined according to the size of the first screen and the size of the second screen. Alternatively, a first resolution of the first display terminal and a second resolution of the second display terminal may be acquired, and a screen partition result of the first display terminal may be determined according to the first resolution and the second resolution. Alternatively, a size of a first screen and a first resolution of the first display terminal and a size of a second screen and a second resolution of the second display terminal may be acquired, and a screen partition result of the first display terminal may be determined according to the size of the first screen, the first resolution, the size of the second screen and the second resolution. However, this embodiment is not limited thereto.

In some exemplary embodiments, the display control method of the present embodiment may be executed by the first display terminal, or by the second display terminal, or by the first display terminal and the second display terminal cooperating. For example, after the first display terminal acquires the size of the second screen and the second resolution from the second display terminal, the first display terminal can determine the screen partition result of the first display terminal by using the size of the first screen and the first resolution of the first display terminal and the size of the second screen and the second resolution of the second display terminal. However, this embodiment is not limited thereto.

In some exemplary embodiments, the screen partition result of the first display terminal may include a first partition number of the first display terminal in a first direction and a second partition number in a second direction. The first partition number and the second partition number may be an integer greater than or equal to 1, and the first partition number and the second partition number may not be 1 at the same time. The total number of partitions of the first screen may be determined according to the first partition number and the second partition number, i.e. the total number of partitions of the first screen is equal to the product of the first partition number and the second partition number. In some examples, multiple partitions of the first screen are arranged regularly and have the same area. For example, the first screen is rectangular, and multiple partitions of the first screen may all be rectangular. However, this embodiment is not limited thereto. For example, multiple partitions may be other shapes, such as triangles, diamonds, pentagons, hexagons, and so on.

In some exemplary embodiments, Step 22 may include: determining a first parameter and a second parameter according to a size of a first screen and a size of a second screen; determining a third parameter and a fourth parameter according to the first resolution and the second resolution; determining a first partition parameter of the first display terminal according to the first parameter and the third parameter; determining a second partition parameter of the first display terminal according to the second parameter and the fourth parameter; and determining a first partition number and a second partition number according to the first partition parameter and the second partition parameter. In some examples, the first parameter is used to reflect the screen size ratio of the first display terminal and the second display terminal in the first direction, for example, the first parameter may be the ratio of the length of the first screen in the first direction to the length of the second screen in the first direction; the second parameter is used to reflect the screen size ratio of the first display terminal and the second display terminal in the second direction, for example, the second parameter may be the ratio of the length of the first screen in the second direction to the length of the second screen in the second direction. The third parameter is used to reflect the pixel ratio of the first display terminal and the second display terminal in the first direction, for example, the third parameter may be the ratio of the number of pixels of the first screen in the first direction to the number of pixels of the second screen in the first direction; the fourth parameter is used to reflect the pixel ratio of the first display terminal and the second display terminal in the second direction, for example, the fourth parameter may be the ratio of the number of pixels of the first screen in the second direction to the number of pixels of the second screen in the second direction. In this example, the first partition number and the second partition number may be automatically and intelligently determined, which supports directly obtaining better results, or can give reference results.

In some exemplary embodiments, the size of the first screen may be $L1 \times W1$ and the size of the second screen may be $L2 \times W2$. The first parameter $NL=L1/L2$ and the second parameter $NW=W1/W2$. The first resolution may be $A1 \times B1$, and the second resolution may be $A2 \times B2$. The third parameter $NA=A1/A2$ and the fourth parameter $NB=B1/B2$.

In some exemplary embodiments, the value of the first partition parameter M0 is the smaller of the first parameter NL and the third parameter NA, and the value of the second parameter N0 is the smaller of the second parameter NW and the fourth parameter NB. In other words, $M0=\min(NA, NL)$ and $N0=\min(NB, NW)$.

In some exemplary embodiments, the determining of the first partition number and the second partition number according to the first partition parameter and the second partition parameter may include: when the first partition parameter is greater than or equal to 2, determining the first partition number using the first partition parameter; when the first partition parameter is less than 2, determining the first partition parameter as a first set value; when the second partition parameter is greater than or equal to 2, determining the second partition number using the second partition parameter; when the second partition parameter is less than 2, determining the second partition number as the second set value. The first set value and the second set value may be integers greater than 0, and may not be 1 at the same time. In some examples, the first set value and the second set value may be the same. For example, the first set value and the second set value may both be 2. Alternatively, the first set value may be different from the second set value. However, this embodiment is not limited thereto.

In some examples, the first set value and the second set value may be set to fixed values. Alternatively, the first set value and the second set value may be updated by the user at the first display terminal or the second display terminal as required. For example, the first set value and the second set value updated by the user need to satisfy an integer greater than 0, and may not be 1 at the same time. However, this embodiment is not limited thereto.

In some exemplary embodiments, when the first partition parameter is greater than or equal to 2 and the second partition parameter is less than 2, the first partition number may be calculated using the first partition parameter and the second partition number may be determined as a second set value. For example, the second set value may be less than or equal to the first partition number. When the second partition parameter is greater than or equal to 2 and the first partition parameter is less than 2, the second partition number may be calculated by using the second partition parameter, and the first partition number is determined as the first set value. For example, the first set value may be less than or equal to the second partition number. In this example, the first set value or the second set value may be determined according to the calculated number of partitions and a better partition result may be automatically obtained.

In some exemplary embodiments, the first partition parameter M0 is greater than or equal to 2, and the value range of the first partition number M may be greater than or equal to 2 and less than or equal to the first partition parameter M0; the second partition parameter N0 is greater than or equal to 2, and the value range of the second partition number N may be greater than or equal to 2 and less than or equal to the second partition parameter N0. That is, $M \in [2, M0]$, $N \in [2, N0]$. In some examples, the first partition number M and the second partition number N may be the same, for example, may both be 2 or may both be 3. However, this embodiment is not limited thereto. For example, the first partition number M and the second partition number N may be different.

In the present exemplary embodiment, the first partition number M represents the number of partitions of the first screen in the first direction X, and the second partition number N represents the number of partitions of the first screen in the second direction Y. By controlling the first partition number M to be less than or equal to M0 and the second partition number N to be less than or equal to N0, it is possible to avoid increasing the processing complexity of image data. For example, when the second display terminal performs partition image display, it is unnecessary to perform super-partition processing on image data transmitted from the first display terminal to the second display terminal. Furthermore, it is possible to avoid that the size of the image displayed at the second display terminal is larger than the size of the partition content of the first display terminal. In the present exemplary embodiment, the range of the first partition number and the second partition number determined using the size of the first screen, the size of the second screen, the first resolution and the second resolution can facilitate the simplification of image processing when the second display terminal performs the partition image data display.

In some exemplary embodiments, when the first partition parameter is greater than or equal to 2, the determining of the first partition number using the first partition parameter may include: calculating a sum of 1 and a half of the first partition parameter M0 to determine the first partition number M. When the second partition parameter is greater than or equal to 2, the determining of the second partition number using the second partition parameter may include: calculating the sum of 1 and half of the second partition parameter N0 to determine the second partition number N. When the first partition parameter M0 is greater than or equal to 2 and the second partition parameter N0 is greater than or equal to 2, the first partition number M=(2+M0)/2 and the second partition number N=(2+N0)/2. According to the above formula, the recommended screen partition result of the first screen may be obtained. The recommended screen partition result comprehensively consider the size, resolution and operation flexibility of the first screen and the second screen, which is beneficial to the improvement of the image display effect and operation accuracy of the subsequent second screen, thus improving the user experience. However, this embodiment is not limited thereto.

In this example, taking the first partition number M as an example, when the calculation result obtained in the calculation process is not an integer, the calculation result may be rounded to determine the final value of the first partition number M. For example, if the calculation results of the first partition number M is 3.5, the final value of the first partition number M may be 4. Similarly, in the calculation process of the first parameter NL, the second parameter NW, the third parameter NA, the fourth parameter NB and the second partition number N, if the calculation result is not an integer, the calculation result may be rounded to determine the final value. However, this embodiment is not limited thereto. In other examples, if the calculation result is a non-integer, the calculation result may be rounded to determine the final value; for example, if the calculation results of the first partition number M is 3.5, the final value of the first partition number M may be 3.

In other exemplary embodiments, a size of a first screen and a size of a second screen may be acquired, and the size of the first screen may be matched with a first preferred resolution, and the size of the second screen may be matched with a second preferred resolution. Then, a first parameter and a second parameter are determined using the size of the first screen and the size of the second screen, and a third parameter and a fourth parameter are determined using the first preferred resolution and the second preferred resolution, wherein the third parameter may be the ratio of the number of pixels in the first direction corresponding to the first preferred resolution to the number of pixels in the first direction corresponding to the second preferred resolution, and the fourth parameter may be the ratio of the number of pixels in the second direction corresponding to the first preferred resolution to the number of pixels in the second direction corresponding to the second preferred resolution. Then, the first partition number and the second partition number are determined using the first parameter, the second parameter, the third parameter, and the fourth parameter. Reference may be made to the description of the foregoing embodiments for this process, so that the description will not be repeated here.

In other exemplary embodiments, a size of a first screen and a size of a second screen may be acquired and the first and second parameters may be determined using the first and second screen sizes. Then, the first partition number and the second partition number are determined according to the first partition parameter being equal to the first parameter and the second partition parameter being equal to the second parameter. The method for determining the first partition number and the second partition number by using the first partition parameter and the second partition parameter may be referred to the description of the foregoing embodiments so that the details will not be repeated here.

In other exemplary embodiments, a first resolution and a second resolution may be acquired, a third parameter and a fourth parameter may be determined using the first and second resolutions, and then a first partition number and a second partition number may be determined according to the first partition parameter being equal to the third parameter and the second partition parameter being equal to the fourth parameter. The method for determining the first partition number and the second partition number by using the first partition parameter and the second partition parameter may be referred to the description of the foregoing embodiments so that the details will not be repeated here.

FIG. 4 is a schematic diagram of a screen partition result of a first screen according to at least one embodiment of the present disclosure. In some exemplary embodiments, taking the example where first display terminal includes a first screen 110 of 110 inches (L1×W1=243.7 cm×137.1 cm) 8K (A1×B1=7680×4320) and second display terminal includes a second screen of 10 inches (L2×W2=22.14 cm×12.45 cm) 180P (A2×B2=1902×1080), first parameter NL=11, second parameter NW=11, third parameter NA=4, fourth parameter NB=4. According to the first parameter NL, the second parameter NW, the third parameter NA, and the fourth parameter NB, combined with the above method of determining the first partition number and the second partition number, a recommended screen partition result may be obtained as follows: the first partition number M=3, and the second partition number N=3. As shown in FIG. 4 the first screen 110 may be divided into 3×3 partitions 110*a* having the same shape and area. However, this embodiment is not limited thereto.

In some exemplary embodiments, the display control method of the present embodiment may further include displaying a screen partition result at least one of the first display terminal and the second display terminal. In some examples, the determined screen partition result may be superimposed on the display interface of the first screen of the first display terminal, and the screen partition result may be represented in a graphic mode. Alternatively, the first display terminal may display the screen partition results in a separate display interface. Alternatively, the first display terminal may display the screen partition result in text form on the display interface of the first screen. The display mode of the screen partition result by the second display terminal may be the same as that of the first display terminal. In some examples, taking the screen partition result including the first partition number M=3 and the second partition number N=3 as an example, the display interface of the first screen of the first display terminal may be displayed in a text mode, for example, displayed as 3×3; alternatively, the first screen may be displayed in a graphic mode on the display interface of the first screen, for example, by dividing lines in the display region of the display interface to divide the first screen into multiple partitions in the form of 3×3. However, this embodiment is not limited thereto.

In some exemplary embodiments, the display control method of the present embodiment may further include updating the screen partition result according to input information detected at the first display terminal or the second display terminal. In some examples, after the recommended screen partition results are obtained through intelligent processing, the recommended screen partition results may be directly utilized; alternatively, the final screen partition result may be determined according to the recommended screen partition result combined with the user's input information. In some examples, taking the screen partition result including the first partition number M and the second partition number N as an example, the values of M and N may be updated according to the input information. However, this embodiment is not limited thereto.

In some exemplary embodiments, the display control method of the present embodiment may further include: determining a selected target partition of the first display terminal from multiple partitions obtained from a screen partition result according to a partition selection operation detected by the first display terminal or the second display terminal, and displaying image data of the target partition at the second display terminal. In this example, the target partition refers to a partial region of the first screen of the first display terminal to be displayed on the second display terminal. For example, the target partition may be determined by performing a mouse-click operation or a key-press operation at the first display terminal or the second display terminal. However, this embodiment is not limited thereto. In the present example, a target partition is selected according to the screen partition result of the first display terminal, so that the second display terminal displays image data of the target partition, thereby improving the image display effect and operation accuracy of the second display terminal and thereby improving the user experience.

In some exemplary embodiments, at the first display terminal, the display mode of the target partition is different from the display mode of the unselected partition. For example, the display brightness of the target partition may be different from the display brightness of the unselected partition; alternatively, the display color of the target partition may be different from the display color of the unselected partition; or display a shadow pattern in the target partition. However, this embodiment is not limited thereto. In this example, the first display terminal displays the target partition in a display mode different from the unselected partition, which is beneficial to the subsequent control and selection of multiple partitions, thereby improving the user experience.

In some exemplary embodiments, the display control method of the present embodiment may further include: taking a touch point of the detected partition touch operation as a datum reference point, determining a partition in which the datum reference point is located as a target partition among multiple partitions obtained from the screen partition result according to a location of the datum reference point on the first screen and a screen partition result of the first display terminal, and displaying image data of the target partition on the second display terminal. In this example, the partition touch operation is used to select the target partition from multiple partitions obtained from the screen partition result, so that the target partition may be quickly selected according to the intelligently obtained screen partition result, and the user experience may be improved.

In some exemplary embodiments, the screen partition result of the first display terminal may include: size and location information of a target partition; the screen region of the first display terminal except the target partition is an unselected partition. For example, the size of the target partition and the unselected partition may be different. In this example, the size can represent the size of the region. For example, if a region is a rectangle, the size of the region may include the length and width of the rectangle; alternatively, if a region is circular, the size of the region may include the diameter or radius of the circle. In this example, the location information of a region may include coordinate locations of specific points of the region. For example, if a certain region is a rectangle, the location information of the region on the first screen may include coordinate locations of the vertices of the four corners of the rectangle on the first screen. For example, if a certain region is a circle, the location information of the area on the first screen may include the coordinate location of the center of the circle on the first screen. In some examples, the target partition may be a regular shape such as a rectangle. However, this embodiment is not limited thereto. For example, the target partition may be a regular shape such as a circle or an oval, or an irregular shape. Compared with the method of partitioning the first screen into multiple partitions with the same area arranged regularly and then selecting from the multiple partitions to determine the target partition, the screen partition result of this example may be adapted to the screen size and shape characteristics of the second display terminal to directly obtain the target partition, and has higher flexibility.

In some exemplary embodiments, step 22 may include: taking the touch point of the detected partition touch operation as a datum reference point, determining the size and location information of the target partition according to the location of the datum reference point on the first screen, the size of the first screen and the size of the second screen; Wherein, the size of the target partition may be greater than or equal to the size of the second screen. In some examples, the size of the target partition may be equal to the size of the second screen, so that the second display terminal can conveniently display the image data of the target partition without further scaling the image data of the target partition. However, this embodiment is not limited thereto. In some examples, when the size of the target partition is larger than the size of the second screen, the image data of the target partition may be displayed on the second display terminal after being appropriately compressed. In some examples, the size of the target partition may be equal to or slightly larger than the size of the second screen, and the clarity of the displayed image on the second screen may be ensured, thereby guaranteeing the image display effect and the operation accuracy on the second screen.

In some examples, a partition touch operation is detected at the first display terminal. Alternatively, the partition touch operation is detected at the second display terminal. When the second display terminal detects the partition touch operation, the location of the touch point of the partition touch operation on the first screen may be determined according to the location of the touch point of the partition touch operation on the second screen and the size relationship between the first screen and the second screen. However, this embodiment is not limited thereto.

In some exemplary embodiments, the display control method of the present embodiment may further include: adjusting a size of a target partition according to at least one of a touch pressure and touch duration of a partition touch operation. For example, when the touch pressure of the partition touch operation is greater than the first threshold value and the touch duration is longer than the second threshold value, the size of the target partition may be increased according to the first ratio. The minimum size of the target partition may be the size of the second screen. In some examples, the partition touch operation may be performed at a first display terminal with which the user interacts directly to determine a partial region to be displayed at a second display terminal. In this way, the interactive experience between the user and the first display terminal may be increased. Alternatively, in some examples, the partition touch operation may be performed at the second display terminal, and the user determines a partial region to be displayed at the second display terminal through the operation at the second display terminal. When the size of the first screen of the first display terminal is too large and it is inconvenient for the user to perform partition touch operation on the first screen, the touch operation on the second display terminal is convenient for the user to operate and improve the use experience of the user. Moreover, the size of the target partition is adjusted by at least one of the touch pressure and the touch duration of the user, so that the selection and adjustment operations of the target partition are integrated, complicated hand operations are not needed, and the operation is simple and convenient to achieve. In this example, the user experience may be improved by using the partition touch operation to control the size of the target partition.

In some exemplary embodiments, the display control method of the present embodiment may further include: taking a touch point of the detected partition touch operation as a datum reference point, determining a target partition according to a location of the datum reference point on the first screen and a size of a single partition obtained according to a screen partition result, and displaying image data of the target partition at a second display terminal. Wherein, the size of the target partition and the size of the individual size obtained from the screen partition result may be the same. In some examples, a region with the same size as a single partition may be selected as the target partition with the datum reference point as the center point (or the lower-left coordinate starting point, or the upper-left coordinate starting point, etc.). In this example, after the recommended screen partition results are obtained by intelligent processing, the size of a single partition of the first screen may be determined, and the target partition may be re-determined in combination with the datum reference point. In some examples, multiple partitions according to screen partition results may have the same size, and the finally determined target partition may have the same size as a single partition. In other examples, where the sizes of multiple partitions are different according to the screen partition result, the size range of a single partition may be obtained according to the screen partition result, and the size of the finally determined target partition may be randomly selected within this size range. In this example, the region partition process and the selection process of the first screen may be synchronized, and the selected target partition may be determined when the region partition is completed, which can simplify the processing process, increase the flexibility of operation, and thereby improve the user experience.

Solutions of this embodiment will be described below through multiple examples.

Figure 5:
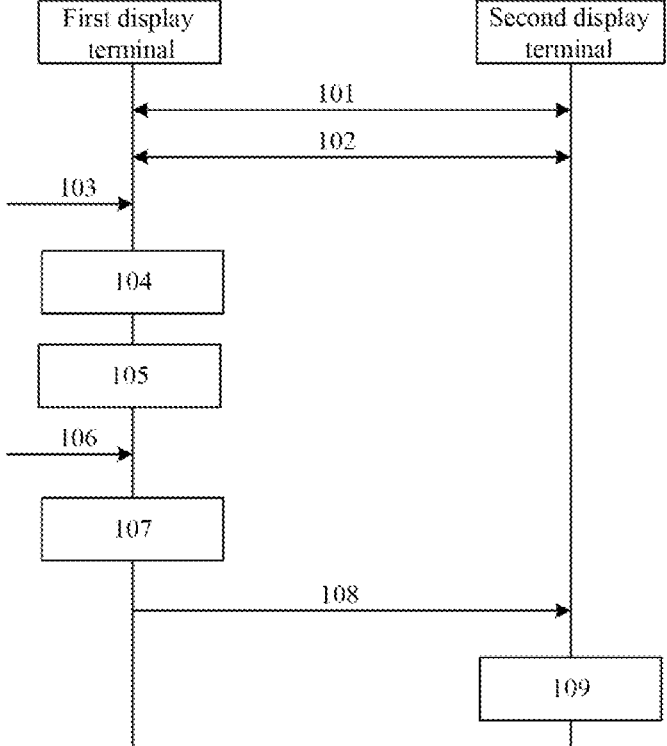
FIG. 5 is a schematic diagram of an interaction flow of a display control system according to at least one embodiment of the present disclosure.
Figure 6:
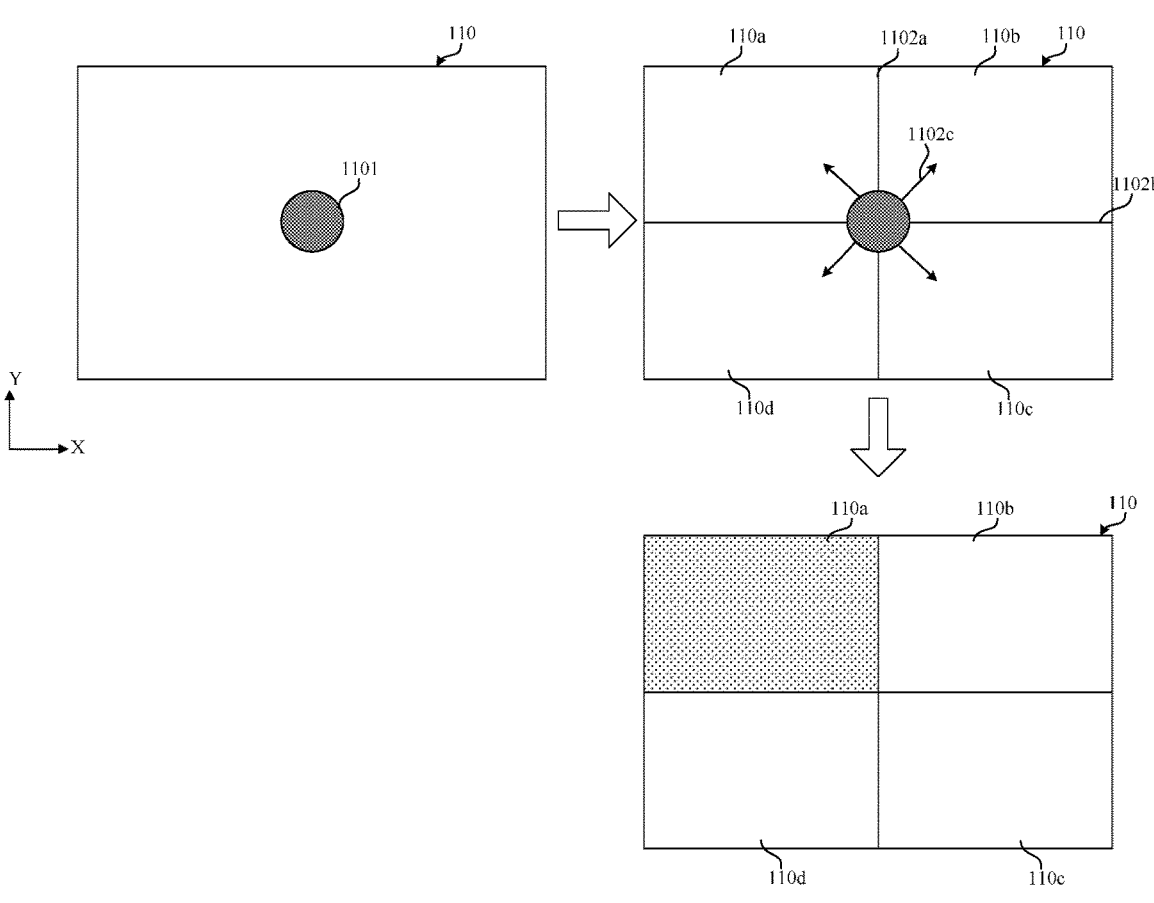
FIG. 6 is a schematic display diagram of a first display terminal according to at least one embodiment of the present disclosure.

FIG. 5 is a schematic diagram of an interaction flow of a display control system according to at least one embodiment of the present disclosure. FIG. 6 is a schematic display diagram of a first display terminal according to at least one embodiment of the present disclosure. In some exemplary implementations, as shown in FIG. 5 and FIG. 6, the interaction process of the display control system of this embodiment may include the following steps.

Step 101, the first display terminal and the second display terminal establish a communication link. In some examples, the first display terminal and the second display terminal may establish a communication link through a wired or wireless manner. For example, the first display terminal and the second display terminal may establish a communication link through Bluetooth, WIFI, ZigBee, Near Field Communication (NFC) and the like.

Step 102, the first display terminal acquires a size of a second screen and a second resolution of the second display terminal.

In some exemplary embodiments, after the second display terminal establishes a communication link with the first display terminal, the second display terminal may actively send a size of a second screen and a second resolution to the first display terminal. Or, after the communication link is established between the second display terminal and the first display terminal, the first display terminal can send a data acquisition request to the second display terminal, and the second display terminal returns a size of a second screen and a second resolution to the first display terminal in response to the received data acquisition request. The size of the first screen and the first resolution of the first display terminal are known to the first display terminal and may be obtained directly.

Step 103, the first display terminal detects the third operation.

In some exemplary embodiments, the third operation may be a touch operation by the user at a central location of the first screen 110 of the first display terminal; alternatively a mouse-click operation (e.g. a click or a double-click) may be performed by the user at a set location of the first screen 110 of the first display terminal; alternatively, the user may press a set key or a combination key of the keyboard of the first display. However, this embodiment is not limited thereto. In other examples, the third operation may be an operation to the second display terminal. For example, the second operation may be to pick up the second display terminal, and then perform steps 104 and 105 directly without making touch selection on the first display terminal, and confirm and display the partition of the first screen in an intelligent manner.

In some exemplary embodiments, as shown in FIG. 6, the first display terminal may display a partition command image 1101 (e.g. a circular or oval shaded image) at a central location of the first screen 110 in response to the third operation. However, this embodiment is not limited thereto. For example, in response to the third operation, the first display terminal may display a partition button or a menu bar or the like on the first screen.

In some exemplary embodiments, as shown in FIG. 6, the partition command image 1101 may be a circular shaded region. For example, the display of the circular shaded region may be achieved in a graphic mode or the display of the circular shaded region may be achieved by subtracting the local backlight on the first screen 110. However, this embodiment is not limited thereto. For example, the partition command image may be shaded regions or icons of other shapes.

Step 104, the first display terminal determines the screen partition result.

In some exemplary embodiments, the first display terminal may determine a screen partition result of the first screen according to the size of the first screen, the first resolution, the size of the second screen, and the second resolution. For example, the first screen 110 may be divided into M×N partitions having the same area and shape. The calculation process of the screen partition result may be referred to the description of the foregoing embodiment, so it will not be described here. In this example, M×N=2×2 is taken as an example.

Step 105, the first display terminal displays the screen partition result.

In some exemplary embodiments, the first display terminal displays the screen partition result in a graphic mode on the first screen 110 in response to the first operation. In some examples, the first operation may be a user touch operation on the partition command image 1101 or a mouse click operation on the partition command image 1101. However, this embodiment is not limited thereto. In some examples, the first display terminal does not need to display the partition command image in response to a third operation, and after determining the screen partition result, the first display terminal may directly display the screen partition result on the first screen in response to the first operation (e.g., a touch operation on a central region of the first screen or a touch operation on a set region of the first screen).

In some exemplary embodiments, as shown in FIG. 6, the first display terminal may display screen partition results (e.g. four partitions 110a to 110d) in a graphic mode on the first screen 110. For example, a partition command image, a dividing line of multiple partitions, is displayed on the first screen 110. 2×2 partitions have a first dividing line 1102a extending in the second direction Y and a second dividing line 1102b extending in the first direction X. The first dividing line 1102a may be a center line of the first screen 110 in the first direction X and the second dividing line 1102b may be a center line of the first screen 110 in the second direction Y. The intersection point of the first dividing line 1102a and the second dividing line 1102b is, for example, a center point of the first screen 110.

In some exemplary embodiments, as shown in FIG. 6, the first screen 110 is also displayed with multiple indicating arrows 1102c, and each indicating arrow 1102c is for indicating a partition. However, this embodiment is not limited thereto. In some examples, you may not need to display the indicating arrow.

Step 106, the first display terminal detects the second operation.

In some exemplary embodiments, the second operation may be a user touch operation for the screen partition result or a mouse click operation for the screen partition result. For example, the second operation may be a touch operation of the indicating arrow 1102c by the user. However, this embodiment is not limited thereto.

Step 107, the first display terminal highlights the selected target partition.

In some exemplary embodiments, as shown in FIG. 6, the first display terminal may determine a selected target partition (e.g., partition 110a is the target partition, and partitions 110b, 110c, and 110d are unselected partitions) in response to a touch operation of the indicating arrow 1102c. The display mode of the target partition of the first screen 110 may be different from the display mode of the remaining partitions. For example, the display brightness of the target partition may be greater than the display brightness of the remaining partitions. That is, the display content of the target partition is highlighted. However, this embodiment is not limited thereto. For example, you can set the target partition to shadow display or grid display. In this example, by highlighting the target partition at the first display terminal, it is convenient for the user to know the region currently controlled by the second display terminal, which is beneficial for the user to control and select later, thereby improving the user experience.

Step 108, the first display terminal transmits the image data of the target partition to the second display terminal.

Step 109, the second display terminal displays the image data of the target partition.

In some exemplary embodiments, after the second display terminal receives the image data of the target partition, the image data of the target partition may be scaled and displayed to improve the display effect.

In the present exemplary embodiment, the first display terminal may intelligently give a recommended screen partition result of the first screen in response to an operation on the first screen, and select a target partition according to the recommended screen partition result to control a display image of the second display terminal. By utilizing the intelligent processing result in this example, the user operation may be reduced, the interaction efficiency between the user and the first display terminal may be improved, and the user experience may be improved.

Figure 7:
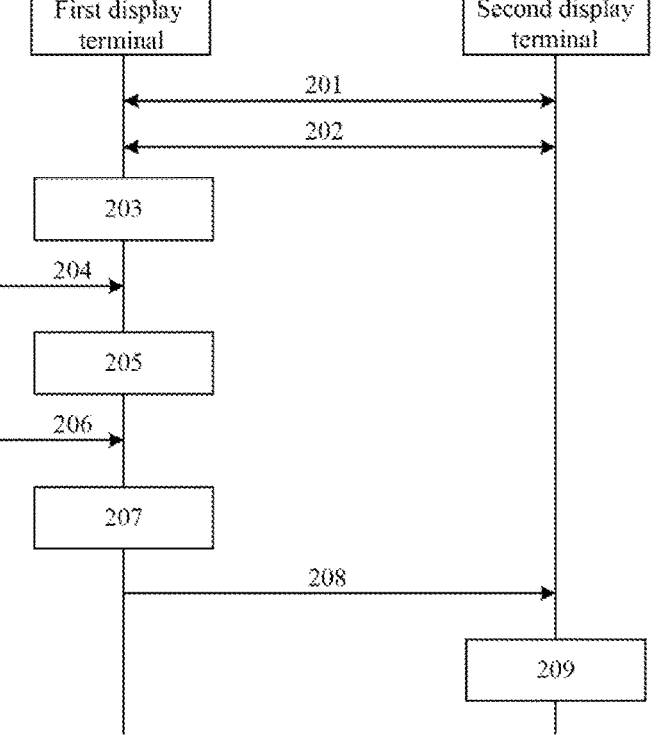
FIG. 7 is another schematic diagram of an interaction flow of a display control system according to at least one embodiment of the present disclosure.
Figures 8, 9:
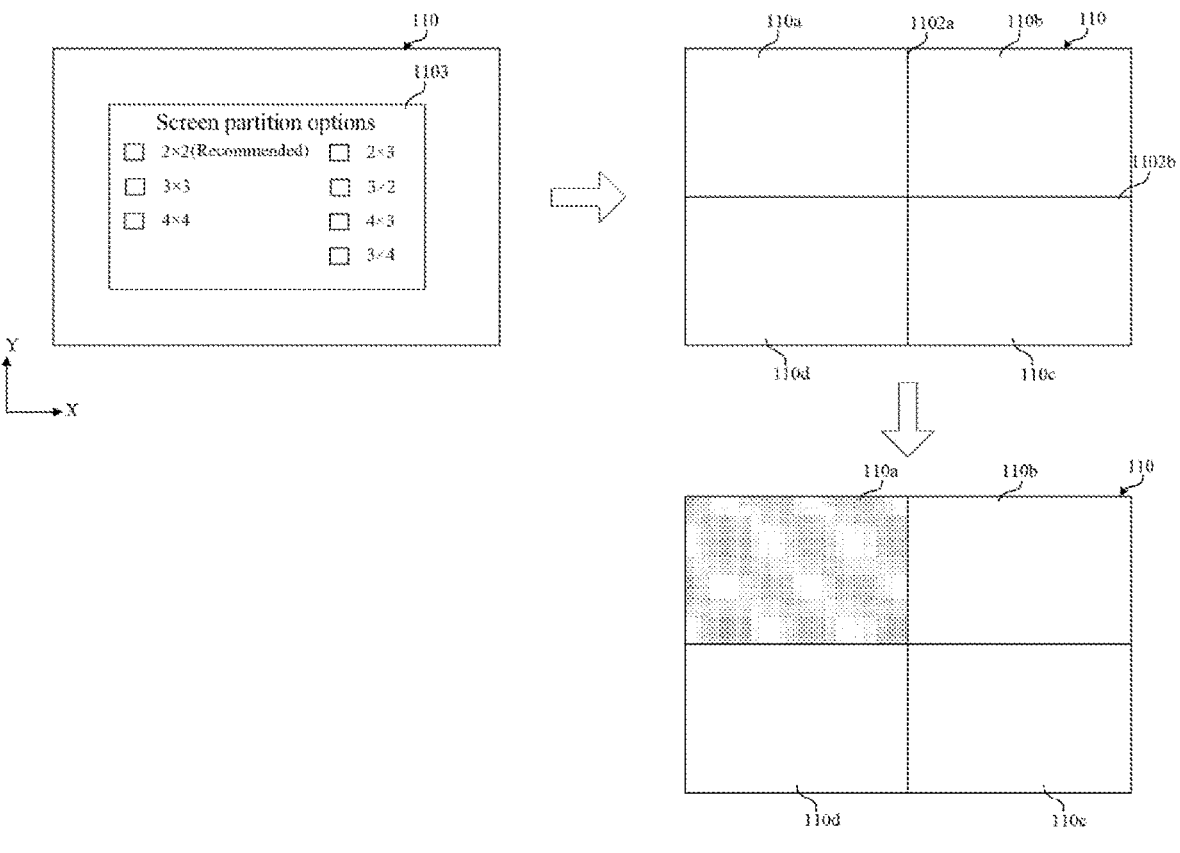
FIG. 8 is another schematic display diagram of a first display terminal according to at least one embodiment of the present disclosure.
FIG. 9 is another schematic diagram of an interaction flow of a display control system according to at least one embodiment of the present disclosure.

FIG. 7 is another schematic diagram of an interaction flow of a display control method according to at least one embodiment of the present disclosure. FIG. 8 is another schematic display diagram of a first display terminal according to at least one embodiment of the present disclosure. In some exemplary implementations, as shown in FIG. 7 and FIG. 8, the interaction process of the display control system of this embodiment may include the following steps.

Step 201, the first display terminal and the second display terminal establish a communication link. In some examples, the first display terminal and the second display terminal may establish a communication link through a wired or wireless manner.

Step 202, the first display terminal acquires a size of a second screen and a second resolution of the second display terminal.

Step 203, the first display terminal determines the screen partition result.

In some exemplary embodiments, the first display terminal may determine a screen partition result of the first screen according to the size of the first screen, the first resolution, the size of the second screen, and the second resolution. For example, the first screen is divided into M×N partitions with the same area and shape. The calculation process of the screen partition result may be referred to the description of the foregoing embodiment, so it will not be described here. In this example, M×N=2×2 is taken as an example.

Step 204, the first display terminal detects the input information.

In some exemplary embodiments, as shown in FIG. 8, a first screen 110 of the first display terminal may display a partition setting interface 1103 in response to a touch operation by a user at the first display terminal. The partition setting interface 1103 can display multiple screen partition options in text mode. The range of the multiple screen partition options satisfies the value range of the first partition number and the second partition number (for example, the first partition number and the second partition number are both greater than or equal to 2 and less than or equal to 4). Wherein, the screen partition result automatically determined by the first display terminal is marked as a recommended option. The user can select the final screen partition result by clicking. In this example, the screen partition result automatically determined by the first display terminal is only for reference, and the final screen partition result may be selected by the user according to actual requirements.

Step 205, the first display terminal displays the screen partition result.

In some exemplary embodiments, as shown in FIG. 8, a final screen partition result may be determined according to the recommended screen partition result combined with user input information, and the final screen partition result is displayed graphically on the first screen 110. In this example, the user selects the recommended screen partition result as an example. The screen partition result is the first screen 110 is divided into 2×2 partitions (i.e., partitions 110*a* to 110*d*) of the same regular arrangement and area. The first screen 110 may display a first dividing line 1102*a* parallel to the second direction Y and a second dividing line 1102*b* parallel to the first direction X of four partitions, and a point of intersection is located in a central region of the first screen 110.

Step 206, the first display terminal detects the partition selection operation.

In some exemplary embodiments, the partition selection operation may be a touch operation or a click operation for any partition. In response to the user's touch operation on any partition, the selected target partition may be determined. For example, a touch point of a detected partition touch operation may be taken as a datum reference point, and a partition in which the datum reference point is located may be determined as a target partition among multiple partitions obtained from a screen partition result according to the location of the datum reference point on the first screen. In this example, partition 110*a* may be the selected target partition. However, this embodiment is not limited thereto.

Step 207, the first display terminal highlights the target partition.

In some exemplary embodiments, the display mode of the target partition of the first screen 110 may be different from the display mode of the remaining partitions. For example, the display brightness of the target partition may be greater than the display brightness of the remaining partitions. That is, the display content of the target partition is highlighted. However, this embodiment is not limited thereto.

Step 208, the first display terminal transmits the image data of the target partition to the second display terminal.

Step 209, the second display terminal displays the image data of the target partition.

For the description of the relevant steps of this embodiment, reference may be made to the description of the previous embodiment, so details are not repeated here.

In other exemplary embodiments, after the user selects the corresponding partition option (e.g., the recommended option is selected) in the partition setting interface 1103, the partition setting interface 1103 may further display the image corresponding to the selected screen partition result, and the user may continue to select the target partition so that the first display terminal directly highlights the target partition on the first screen and displays the remaining partitions at normal brightness. That is, after the user selects the target partition in the partition setting interface 1103, the first display terminal can directly execute step 207. However, this embodiment is not limited thereto.

In the exemplary embodiment, the final screen partition result is determined by combining the recommended screen partition result given by the first display terminal and the input information of the user, which can fully combine the characteristics of intelligent processing and personalized requirements to meet different actual requirements, thereby improving the user experience.

FIG. 9 is another schematic diagram of an interaction flow of a display control system according to at least one embodiment of the present disclosure. In some exemplary implementations, as shown in FIG. 9, the interaction process of the display control system of this embodiment may include the following steps.

Step 301, the first display terminal and the second display terminal establish a communication link. In some examples, the first display terminal and the second display terminal may establish a communication link through a wired or wireless manner.

Step 302, the first display terminal acquires a size of a second screen and a second resolution of the second display terminal.

Step 303, the first display terminal detects the partition touch operation.

Figures 10, 11:
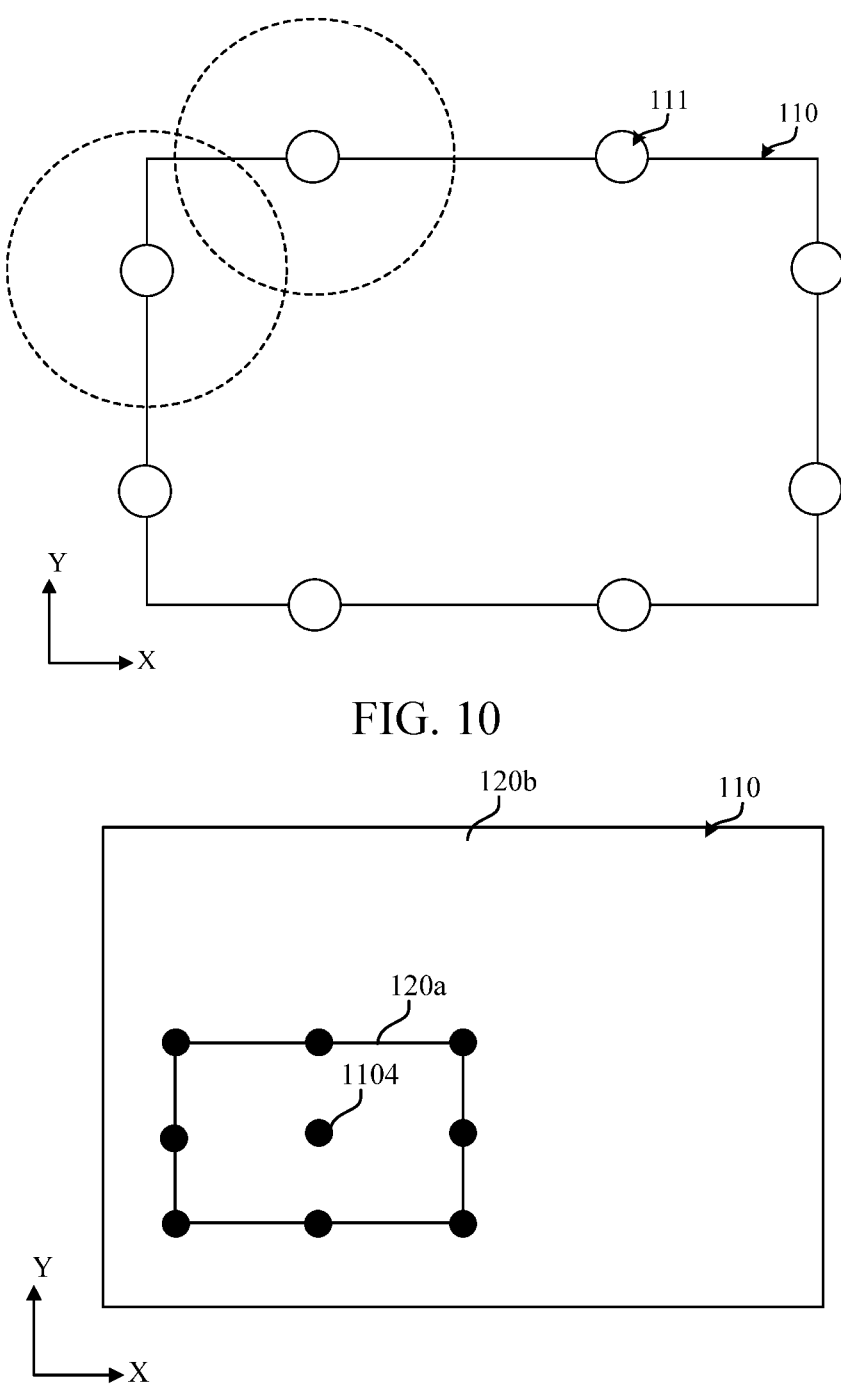
FIG. 10 is a schematic diagram of a structure of a first display terminal according to at least one embodiment of the present disclosure.
FIG. 11 is another schematic display diagram of a first display terminal according to at least one embodiment of the present disclosure.

FIG. 10 is a schematic diagram of a structure of a first display terminal according to at least one embodiment of the present disclosure. In some exemplary embodiments, the first display terminal at least includes a first screen 110 and multiple sensors 111. Multiple sensors 111 may be disposed around the first screen 110. For example, the first screen 110 is rectangular and two or more sensors 111 may be provided on each side of the first screen 110. Two adjacent sensors 111 are spaced apart by a certain distance. In some examples, sensor 111 may be an infrared sensor that detects touch points of a partition touch operation in a first direction X and a second direction Y in a plane parallel to the first screen 110 by emitting an infrared signal. Each sensor 111 sets a detection radius and, after emitting an infrared signal, detects a returned infrared signal within the detection radius. In some examples, the screen location of the touch point of the partition touch operation may be determined according to the infrared signals detected in the first direction X and the second direction Y. However, this embodiment is not limited thereto. In other examples, the first screen may integrate touch functionality to determine the screen location of the touch point by recognizing the touch location.

Step 304, the first display terminal determines the size and location information of the target partition according to the datum reference point, the size of the first screen and the size of the second screen.

In some exemplary embodiments, the touch point of the detected partition touch operation is used as a datum reference point. For example, if the target partition is rectangular, the datum reference point may be the center point, upper left corner endpoint, upper right corner endpoint, lower left corner endpoint, lower right corner endpoint, upper center point, lower center point, left center point or right center point of the target partition. However, this embodiment is not limited thereto. For example, if the target partition is a circle, the datum reference point may be the center of the target partition. Alternatively, the target partition is rectangular, and the datum reference point may be the center point, upper left endpoint, upper right endpoint, lower left endpoint, or lower right endpoint of the target partition.

In some exemplary embodiments, the location of the datum reference point in the target partition may be prese-lected, for example, the center point of the rectangle may be preset as the datum reference point. Alternatively, the location of the datum reference point in the target partition may be set by taking into account factors such as the user's location, height, the location of the first screen and the like. For example, if the height of the user is approximately the same as the height of the first screen, the datum reference point may be set as the upper left corner endpoint, the upper center point or the upper right corner endpoint of the target partition. For another example, if the height of the user is lower than the height of the first screen, the datum reference point may be set as the center point, the left center point or the right center point of the target partition. However, this embodiment is not limited thereto.

FIG. 11 is a schematic diagram of a screen partition of a first display terminal according to at least one embodiment of the present disclosure. In some exemplary embodiments, as shown in FIG. 11, a datum reference point 1104 is illustrated as an example of the center point of the target partition 120a. The size of the target partition 120a may be the same as the size of the second screen. According to the size of the second screen and the center point of the target partition 120, the locations of four endpoints of the target partition 120a (i.e., the upper left corner endpoint, the upper right corner endpoint, the lower left corner endpoint and the lower right corner endpoint) may be determined to obtain the target partition 120a having the same size as the size of the second screen. The screen region of the first screen 110 other than the target partition 120a is the unselected partition 120b. The sizes of the target partition 120a and the unselected partition 120b may be different.

Figure 12:
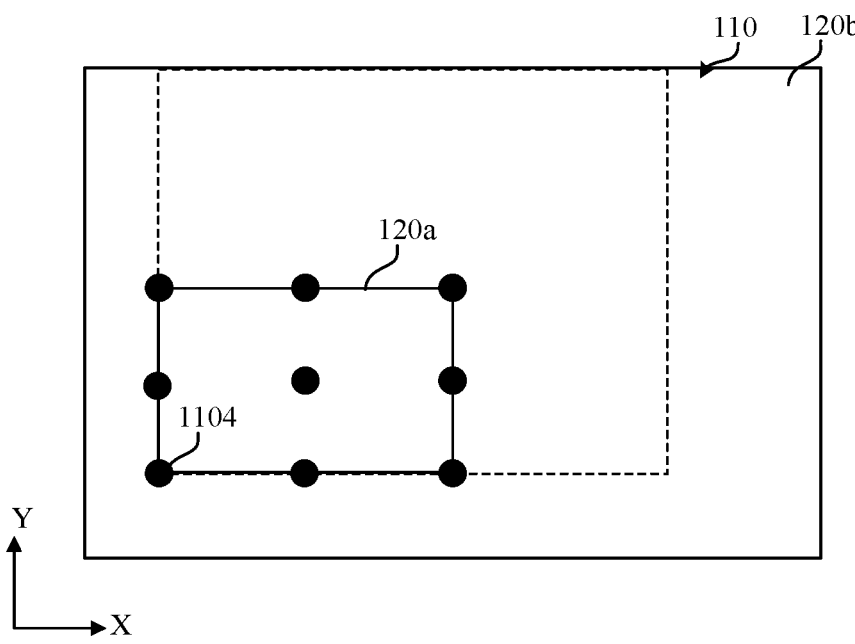
FIG. 12 is another schematic display diagram of a first display terminal according to at least one embodiment of the present disclosure.

FIG. 12 is another schematic diagram of a screen partition of a first display terminal according to at least one embodiment of the present disclosure. In some exemplary embodiments, as shown in FIG. 12, the datum reference point 1104 is illustrated as an example of the lower left corner endpoint of the target partition 120a. The size of the target partition 120a may be the same as the size of the second screen. According to the size of the second screen and the lower left corner endpoint of the target partition 120a, the locations of four endpoints of the target partition 120a may be determined to obtain the target partition 120a having the same size as the size of the second screen. The screen region of the first screen 110 other than the target partition 120a is the unselected partition 120b. The sizes of the target partition 120a and the unselected partition 120b may be different.

In some exemplary embodiments, the selected target partition 120a may be scaled up, i.e., the scaling ratio k in the first direction X and in the second direction Y may be the same. When the target partition 120a is enlarged to the edge of the first screen 110 in one direction, that is, the enlarging ratio k at this time is the maximum enlarging ratio of the target partition 120a in a single direction, and the largest target partition may be obtained according to the maximum enlarging ratio. The dotted region shown in FIG. 12 is the largest target partition. In this example, the size of the target partition 120a is K times the size of the second screen, wherein K is greater than or equal to 1 and less than the ratio between the size of the first screen and the size of the second screen. Where $K=k \times k$.

In some exemplary embodiments, k may be determined according to at least one of the touch pressure and the touch duration of the partition touch operation. For example, the touch duration of the partition touch operation may be proportional to k, i.e., the size of the target partition may be increased by extending the touch duration. For another example, the touch pressure of the partition touch operation may be proportional to k, i.e., the size of the target partition may be increased by increasing the touch pressure. However, this embodiment is not limited thereto.

Step 305, the first display terminal transmits the image data of the target partition to the second display terminal.

Step 306, the second display terminal displays the image data of the target partition.

In other exemplary embodiments, the first display terminal may obtain a screen partition result of the first screen (for example, the first screen is divided into M×N regularly arranged partitions with the same area) with reference to the manner of the foregoing embodiments, and the size of a single partition may be obtained according to the screen partition result of the first screen and the size of the first screen. In Step 304, the first display terminal may determine the size and location information of the target partition using the touch point of the detected partition touch operation as the datum reference point and in combination with the size of the single partition. For example, taking a datum reference point as a center point of the target partition, a target partition having the same size as that of the single partition is obtained. In this example, the size of the target partition and the size of a single partition obtained from the screen partition result may be the same, but since the location of the target partition is different from the location of multiple partitions corresponding to the screen partition result, the image data of the target partition may be different from the image data of the multiple partitions. The process of determining the size and location information of the target partition may be described with reference to the above step 304 and is therefore not described here.

In other exemplary embodiments, step 303 may be performed by the second display terminal, that is, the user performs the partition touch operation at the second display terminal, after the second display terminal detects the partition touch operation, the location information of the touch point of the partition touch operation on the second screen may be determined, and the second display terminal may determine the mapping location of the touch point on the first screen according to the location information of the touch point of the partition touch operation on the second screen and the size relationship between the first screen and the second screen. Then, the mapping location of the touch point on the first screen is used as a datum reference point, and the size and location information of the target partition are determined in combination with the size of the first screen and the size of the second screen. The determination of the size and location information of the target partition may be described with reference to the above step 304 and is therefore not described here.

In the present exemplary embodiment, the screen partition determination process and the target partition selection process may be implemented synchronously, so that the operation may be simplified and the user experience may be improved. Moreover, the selection mode of the target partition in this embodiment is flexible, and the shape of the target partition is not limited, which is beneficial to supporting the partition display when the second screen of the second display terminal has an irregular shape.

Figure 13:
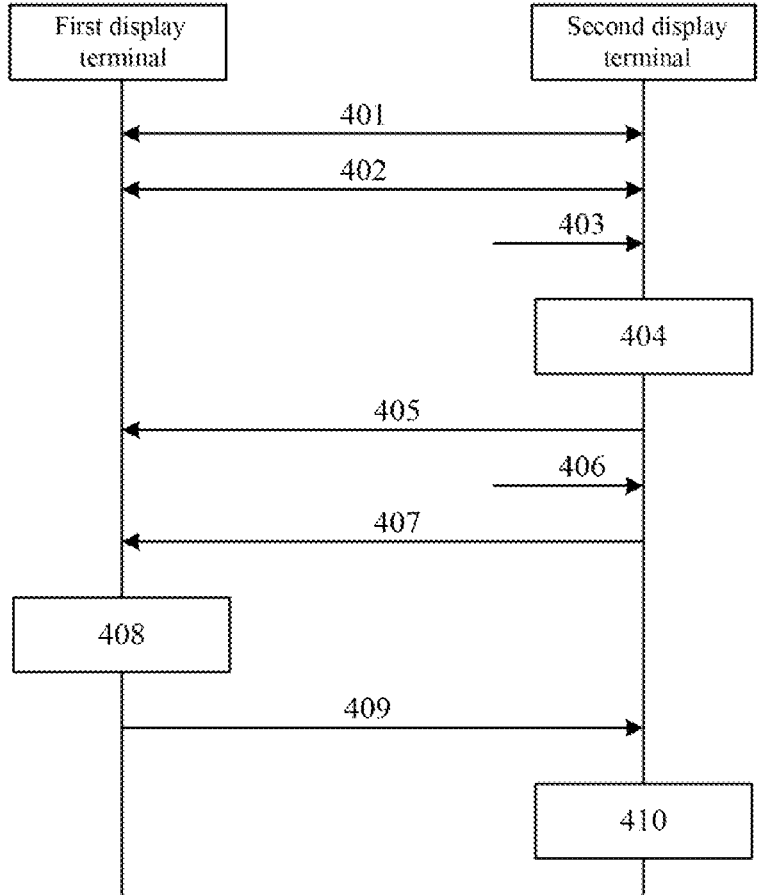
FIG. 13 is another schematic diagram of an interaction flow of a display control system according to at least one embodiment of the present disclosure.

FIG. 13 is another schematic diagram of an interaction flow of a display control system according to at least one embodiment of the present disclosure. In some exemplary implementations, as shown in FIG. 13, the interaction process of the display control system of this embodiment may include the following steps.

Step 401, the first display terminal and the second display terminal establish a communication link. In some examples, the first display terminal and the second display terminal may establish a communication link through a wired or wireless manner.

Step 402, the second display terminal acquires the size of the first screen and the second resolution of the first display terminal.

Step 403, the second display terminal detects the partition triggering operation.

In some exemplary embodiments, the partition triggering operation may be a touch operation by a user at a central location of a second screen of the second display terminal; alternatively, an operation may be selected for the menu of the user on the second screen of the second display terminal. However, this embodiment is not limited thereto.

Step 404, the second display terminal determines and displays the screen partition result of the first display terminal.

In some exemplary embodiments, the second display terminal may determine a screen partition result of the first screen according to the size of the first screen, the first resolution, the size of the second screen, and the second resolution. For example, the first screen may be divided into M×N partitions with the same area and shape. The calculation process of the screen partition result may be referred to the description of the foregoing embodiment, so it will not be described here. The second display terminal can display the screen partition result in a graphic mode or a text mode on the second screen. However, this embodiment is not limited thereto.

Step 405, the second display terminal sends the screen partition result to the first display terminal.

In some exemplary embodiments, the screen partition result may be displayed on the first screen after the first display terminal receives the screen partition result. However, this embodiment is not limited thereto.

Step 406, the second display terminal detects the partition selection operation.

In some exemplary embodiments, the partition selection operation may be a user touch operation on the second screen for the screen partition result, or a mouse click operation for the screen partition result. However, this embodiment is not limited thereto.

Step 407, the second display terminal transmits the information of the selected target partition to the first display terminal.

Step 408, the first display terminal highlights the selected target partition.

Step 409, the first display terminal transmits the image data of the selected target partition to the second display terminal.

Step 410, the second display terminal displays the image data of the target partition.

For detailed descriptions of relevant steps in this embodiment, reference may be made to the descriptions of the foregoing embodiments, so details are not repeated here.

In the exemplary embodiment, the user achieves the operation of the first display terminal through the interaction between the user and the second display terminal, and the second display terminal can provide an intelligent partition determination process, thereby simplifying the operation of the user to the first display terminal and further improving the operation experience of the user.

The interaction process of the display control system of this embodiment is only some exemplary explanation. In some exemplary embodiments, the above interaction processes may be combined with each other. For example, in the embodiment shown in FIG. 5, after automatically determining the screen partition result, the first display terminal may adjust the size of the selected target partition in response to at least one of the touch pressure and the touch duration of the partition touch operation of the first screen, for example, increase the size of the selected target partition. However, this embodiment is not limited thereto.

In some exemplary embodiments, the display control system provided by the present embodiment may include a first display terminal and a second display terminal. The first display terminal has a size of a first screen larger than a size of a second screen of the second display terminal, and the first display terminal has a first resolution greater than or equal to a second resolution of the second display terminal. The first display terminal or the second display terminal is configured to acquire at least one of a size of a first screen and a first resolution of the first display terminal and at least one of a size of a second screen and a second resolution of the second display terminal; determining a screen partition result of the first display terminal according to at least one of the size of the first screen and the first resolution, and at least one of the size of the second screen and the second resolution;

In some exemplary embodiments, the first display terminal may at least include a first screen. The first display terminal is configured to display the screen partition result on the first screen in response to a first operation.

In some exemplary embodiments, the second display terminal may at least include a second screen. The first display terminal is configured to determine a selected target partition in response to a second operation for the screen partition result and transmit image data of the target partition to the second display terminal. The second display terminal is configured to synchronously display image data of the target partition through the second screen.

In some exemplary embodiments, the first display terminal may at least include a first screen and multiple sensors disposed around the first screen. The first display terminal is configured to detect a touch point of a partition touch operation through the multiple sensors, take the touch point as a datum reference point, determine the size and location information of a target partition according to the location of the datum reference point on the first screen, the size of the first screen and the size of the second screen, and transmit the image data of the target partition to the second display terminal. Wherein, the size of the target partition is greater than or equal to the size of the second screen. Alternatively, the first display terminal is configured to use a touch point of a partition touch operation detected by the multiple sensors as a datum reference point, determine a target partition according to a location of the datum reference point on the first screen and a size of a single partition obtained according to the screen partition result, and transmit image data of the target partition to the second display terminal, wherein the size of the target partition is the same as the size of a single partition obtained according to the screen partition result.

In some exemplary embodiments, the first display terminal may be further configured to adjust the size of the target partition according to at least one of a touch duration and a touch pressure of the partition touch operation.

Figure 14:
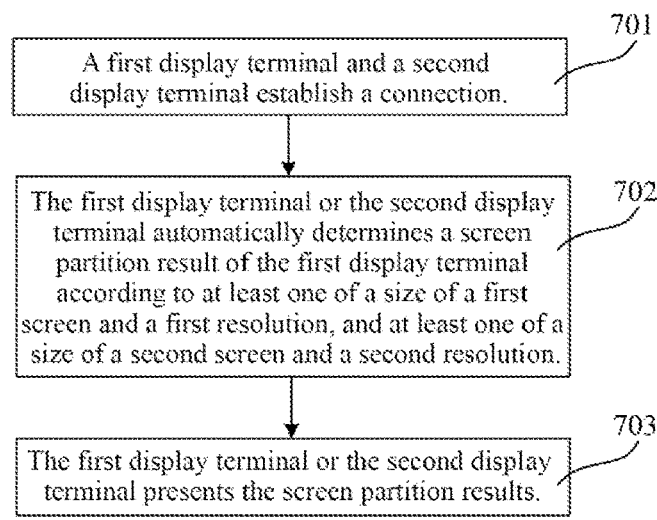
FIG. 14 is another flowchart of a display control method of at least one embodiment of the present disclosure.

FIG. 14 is another flowchart of a display control method of at least one embodiment of the present disclosure. In some exemplary embodiments, as shown in FIG. 14, the display control method provided by the present embodiment may include:

Step 701, the first display terminal and the second display terminal establish a connection.

Step 702, the first display terminal or the second display terminal automatically determine a screen partition result of the first display terminal according to at least one of a size of a first screen and a first resolution of the first display terminal and at least one of a size of a second screen and a second resolution of the second display terminal.

Step 703, the first display terminal or the second display terminal present the screen partition result.

In some examples, after the first display terminal and the second display terminal establish a connection for the first time, the first display terminal or the second display terminal may determine a screen partition result of the first display terminal (e.g., the screen partition result may include a first partition number and a second partition number) using the manner of the foregoing embodiments. Then, at least one of the first display terminal and the second display terminal displays the screen partition result, for example, in a text mode or in a graphic mode. However, this embodiment is not limited thereto.

In some examples, the first display terminal or the second display terminal may store the screen partition result after determining the screen partition result. When the first display terminal and the second display terminal are connected again, the screen partition result determined before may be directly utilized. However, this embodiment is not limited thereto. For example, each time the first display terminal and the second display terminal are connected, the screen partition result of the first display terminal may be determined and the stored screen partition result may be updated using the manner of the foregoing embodiment.

For the rest of the description of the display control method of this embodiment, reference may be made to the description of the foregoing embodiment, so details are not repeated here.

At least one embodiment of the present disclosure further provides a first display terminal, which includes a first screen, a first memory and a first processor. The first screen is connected with the first processor. The first memory is suitable for storing a computer program, and when the computer program is executed by the first processor, the steps of the above-mentioned display control method are achieved.

Figure 15:
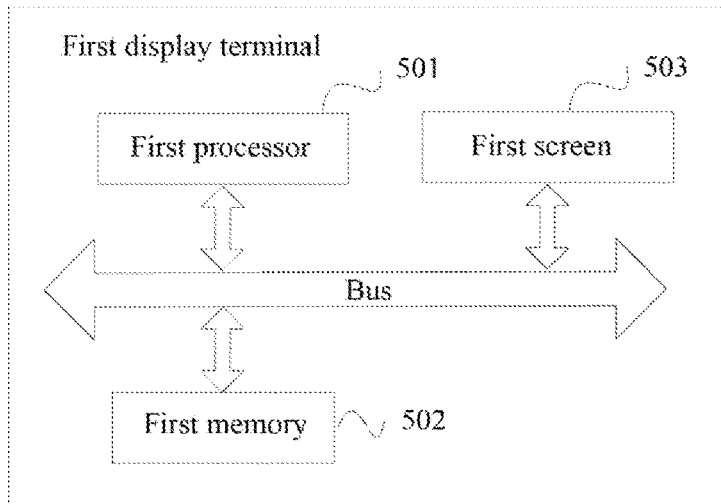
FIG. 15 is a schematic diagram of a structure of a first display terminal according to at least one embodiment of the present disclosure.

FIG. 15 is a schematic diagram of a structure of a first display terminal according to at least one embodiment of the present disclosure. In some exemplary embodiments, as shown in FIG. 15, the first display terminal of the present embodiment may include a first processor 501, a first memory 502, and a first screen 503. The first processor 501, the first memory 502, and the first screen 503 may be connected via a bus. The first memory 502 is suitable for storing a computer program, and when the computer program is executed by the first processor 501, the steps of the display control method provided by the above-mentioned embodiments are implemented.

In some exemplary embodiments, the first processor 501 may include a processing apparatus such as a Microcontroller Unit (MCU), or a Field-Programmable Gate Array (FPGA), or the like. The first memory 502 may store a software program and modules, of application software, such as program instructions or modules corresponding to a display control method in this embodiment. The first processor 501 performs various function applications and data processing by running the software program and modules stored in the first memory 502, for example, implements the display control method provided in this embodiment. The first memory 502 may include a high-speed random access memory, and may also include a non-volatile memory such as one or more magnetic storage apparatuses, flash memory, or other non-volatile solid-state memory. In some examples, the first memory 502 may include memories remotely provided with respect to the first processor 501, and these remote memories may be connected to a first display terminal through a network. Examples of the above network include, but are not limited to, the Internet, an intranet, a local area network, a mobile communication network, and combinations thereof.

In some exemplary embodiments, the first screen 503 may include a display panel, for example, may be configured using a liquid crystal display panel (LCD), an organic light emitting diode panel or the like. The first screen 503 may also include a touch panel. The touch panel can collect the user's touch operations on or near it (for example, the user's operations on or near the touch panel with any suitable objects or accessories such as fingers and stylus), and achieve the corresponding operations according to a preset program. For example, the user clicks on the quick identification of the function module. The touch panel may be achieved by resistive, capacitive, infrared and surface acoustic waves. In some examples, the touch panel may cover the display panel. After the touch panel detects a touch operation on or near it, the touch operation is sent to the first processor to determine the type of the touch event, and then the first processor provides corresponding interface output on the display panel according to the type of the touch event. The touch panel and the display panel may be used as two independent components to achieve the input and output functions of mobile terminal. In some examples, input and output functions may be implemented by integrating a touch panel and a display panel.

At least one embodiment of the present disclosure further provides a second display terminal, which includes a second screen, a second memory and a second processor. The second screen is connected with the second processor. The second memory is suitable for storing a computer program, and when the computer program is executed by the second processor, the steps of the above-mentioned display control method are achieved.

Figure 16:
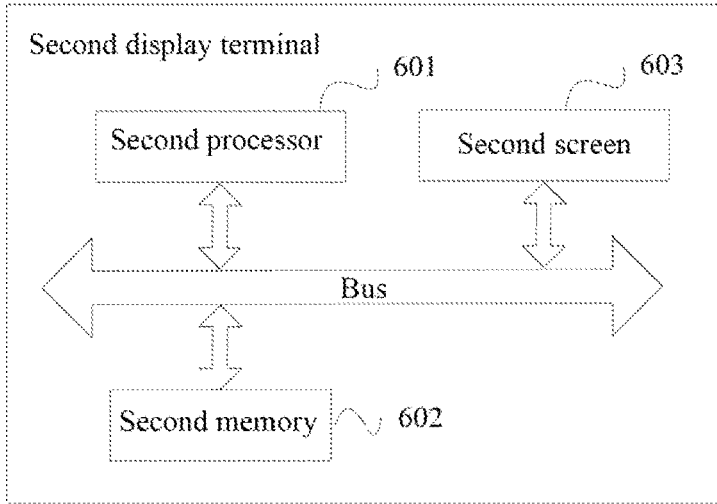
FIG. 16 is a schematic diagram of a structure of a second display terminal according to at least one embodiment of the present disclosure.

FIG. 16 is a schematic diagram of a structure of a second display terminal according to at least one embodiment of the present disclosure. In some exemplary embodiments, as shown in FIG. 16, the second display terminal of the present embodiment may include a second processor 601, a second memory 602, and a second screen 603. The second processor 601, the second memory 602, and the second screen 603 may be connected via a bus. The second memory 602 is suitable for storing a computer program, and when the computer program is executed by the second processor 601, the steps of the display control method provided by the above-mentioned embodiments are implemented.

For the related description of the second processor 601, the second memory 602, and the second screen 603 of the present embodiment, reference may be made to the foregoing related descriptions of the first processor 501, the first memory 502, and the first screen 503, and therefore the description will not be repeated here.

In addition, at least one embodiment of the present disclosure further provides a non-transitory computer-readable storage medium, storing a computer program, wherein when the computer program is performed, the acts of the above display control method are implemented.

Those of ordinary skills in the art may understand that all or some of acts in methods, functional modules or units in systems and apparatuses disclosed above may be implemented as software, firmware, hardware, and an appropriate combination thereof. In a hardware implementation, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile, and removable and irremovable media implemented in any method or technology for storing information (for example, a computer-readable instruction, a data structure, a program module, or other data). The computer storage medium includes, is but not limited to, a Random Access Memory (RAM), a Read-Only Memory (ROM), an Electrically Erasable Programmable ROM (EE-PROM), a flash memory or other memory technologies, a Compact Disc Read-Only Memory (CD-ROM), a Digital Video Disk (DVD) or other optical discs, a cassette, a magnetic tape, a disk memory or other magnetic storage apparatuses, or any other medium configurable to store expected information and accessible by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

The above shows and describes basic principles, main features, and advantages of the present disclosure. The present disclosure is not limited by the above embodiments. The above embodiments and descriptions in the specification only illustrate the principles of the present disclosure. Without departing from the spirit and scope of the present disclosure, there will be many changes and improvements in the present disclosure, and all of these changes and improvements fall within the protection scope of the present disclosure.

The invention claimed is:

1. A display control method, comprising:

acquiring at least one of a size of a first screen and a first resolution of a first display terminal and at least one of a size of a second screen and a second resolution of a second display terminal; and determining a screen partition result of the first display terminal according to at least one of the size of the first screen and the first resolution, and at least one of the size of the second screen and the second resolution;

wherein the size of the first screen is larger than the size of the second screen, and the first resolution is greater than or equal to the second resolution;

the screen partition result of the first display terminal comprises: a number of first partitions along a first direction and a number of second partitions along a second direction of the first display terminal; and the first direction intersects the second direction;

the determining a screen partition result of the first display terminal according to at least one of the size of the first screen and the first resolution, and at least one of the size of the second screen and the second resolution comprises:

determining a first parameter and a second parameter according to the size of the first screen and the size of the second screen, wherein the first parameter is used to reflect a screen size ratio of the first display terminal and the second display terminal in the first direction, and the second parameter is used to reflect a screen size ratio of the first display terminal and the second display terminal in the second direction;

determining a third parameter and a fourth parameter according to the first resolution and the second resolution, wherein the third parameter is used to reflect a pixel ratio of the first display terminal and the second display terminal in the first direction, and the fourth parameter is used to reflect a pixel ratio of the first display terminal and the second display terminal in the second direction;

determining a first partition parameter of the first display terminal according to the first parameter and the third parameter; determining a second partition parameter of the first display terminal according to the second parameter and the fourth parameter; and determining a first partition number and a second partition number according to the first partition parameter and the second partition parameter.

2. The method according to claim 1, wherein a value of the first partition parameter is the smaller of the first parameter and the third parameter, and the value of the second partition parameter is the smaller of the second parameter and the fourth parameter.

3. The method according to claim 1, wherein the determining of a first partition number and a second partition number according to the first partition parameter and the second partition parameter comprises:

when the first partition parameter is greater than or equal to 2, determining the first partition number by using the first partition parameter; when the first partition parameter is less than 2, determining the first partition number as a first set value; and when the second partition parameter is greater than or equal to 2, determining the second partition number by using the second partition parameter; and when the second partition parameter is less than 2, determining the second partition number as a second set value.

4. The method according to claim 3, wherein the determining of the first partition number using the first partition parameter comprises: calculating a sum of 1 and half of the first partition parameter to obtain the first partition number; and the determining of the second partition number by using the second partition parameter comprises: calculating the sum of 1 and half of the second partition parameter to obtain the second partition number.

5. The method according to claim 3, wherein the first partition parameter is greater than or equal to 2, and the first partition number is greater than or equal to 2 and less than or equal to the first partition parameter; and the second partition parameter is greater than or equal to 2, and the second partition number is greater than or equal to 2 and less than or equal to the second partition parameter.

6. The method according to claim 1, further comprising: displaying the screen partition result at least one of the first display terminal and the second display terminal.

7. The method according to claim 6, further comprising: updating the screen partition result according to input information detected at the first display terminal or the second display terminal.

8. The method according to claim 6, further comprising: determining a selected target partition of the first display terminal from a plurality of partitions obtained from the screen partition result according to a partition selection operation detected at the first display terminal or the second display terminal, and displaying image data of the target partition at the second display terminal;

wherein at the first display terminal, the display mode of the target partition is different from the display mode of the unselected partition.

9. The method according to claim 1, further comprising: taking a touch point of the detected partition touch operation as a datum reference point, determining a partition in which the datum reference point is located as a target partition among a plurality of partitions obtained from the screen partition result according to a location of the datum reference point on the first screen and a screen partition result of the first display terminal, and displaying image data of the target partition on the second display terminal.

10. The method according to claim 1, further comprising: taking a touch point of the detected partition touch operation as a datum reference point, determining a target partition of the first screen according to a location of the datum reference point on the first screen and a size of a single partition obtained from the screen partition result; and displaying image data of the target partition at the second display terminal;

wherein the size of the target partition is the same as the size of a single partition obtained according to the screen partition result.

11. The method according to claim 1, wherein the screen partition result of the first display terminal comprises: size and location information of a target partition; and the method further comprises displaying image data of the target partition at the second display terminal;

wherein the determining of a screen partition result of the first display terminal according to at least one of the size of the first screen and the first resolution, and at least one of the size of the second screen and the second resolution comprises:

taking the touch point of the detected partition touch operation as a datum reference point, determining the size and location information of the target partition according to the location of the datum reference point on the first screen, the size of the first screen and the size of the second screen; wherein the size of the target partition is greater than or equal to the size of the second screen, wherein the method further comprises: adjusting the size of the target partition according to at least one of a touch pressure and a touch duration of the partition touch operation.

12. A first display terminal comprising: a first screen, a first memory and a first processor, the first screen is coupled to the first processor, the first memory is adapted to store a computer program that, when executed by the first processor, implements the steps of a display control method according to claim 1.

13. A second display terminal comprising: a second screen, a second memory and a second processor, the second screen is coupled to the second processor, the second memory is adapted to store a computer program that, when executed by the second processor, implements the steps of the display control method according to claim 1.

14. A non-transitory computer readable storage medium, storing a computer program, wherein when the computer program is performed, the steps of the display control method of claim 1 is implemented.

15. A display control system comprising: a first display terminal and a second display terminal, the first display terminal has a size of a first screen larger than a size of a second screen of the second display terminal, and the first display terminal has a first resolution greater than or equal to a second resolution of the second display terminal;

wherein the first display terminal or the second display terminal is configured to:

acquire at least one of a size of a first screen and a first resolution of the first display terminal and at least one of a size of a second screen and a second resolution of the second display terminal; and determine a screen partition result of the first display terminal according to at least one of the size of the first screen and the first resolution, and at least one of the size of the second screen and the second resolution;

wherein the first display terminal at least comprises: a first screen;

the first display terminal is configured to display the screen partition result on the first screen in response to a first operation;

the second display terminal at least comprises: a second screen;

the first display terminal is configured to determine a selected target partition in response to a second operation for the screen partition result and transmit image data of the target partition to the second display terminal; and the second display terminal is configured to synchronously display image data of the target partition through the second screen.

16. The system according to claim 15, wherein the first display terminal at least comprises: a first screen and a plurality of sensors disposed around the first screen;

the first display terminal is configured to: detect a touch point of a partition touch operation through the plurality of sensors, take the touch point as a datum reference point, determine the size and location information of a target partition according to the location of the datum reference point on the first screen, the size of the first screen and the size of the second screen, and transmit the image data of the target partition to the second display terminal; wherein the size of the target partition is greater than or equal to the size of the second screen; or the first display terminal is configured to use a touch point of a partition touch operation detected by the plurality of sensors as a datum reference point, determine a target partition of the first screen according to a location of the datum reference point on the first screen and a size of a single partition obtained according to the screen partition result, and transmit image data of the target partition to the second display terminal, wherein the size of the target partition is the same as the size of a single partition obtained according to the screen partition result;

wherein the first display terminal is further configured to adjust the size of the target partition according to at least one of a touch duration and a touch pressure of the partition touch operation.

17. A display control method, comprising:

a first display terminal and a second display terminal establishing a connection;

the first display terminal or the second display terminal automatically determining a screen partition result of the first display terminal according to at least one of a size of a first screen and a first resolution of the first display terminal and at least one of a size of a second screen and a second resolution of the second display terminal; and the first display terminal or the second display terminal presenting the screen partition result;

wherein the first display terminal or the second display terminal presenting the screen partition result comprises:

the first display terminal or the second display terminal presenting the screen partition result in a graphic mode, or presenting the screen partition result in a text mode;

the screen partition result of the first display terminal comprises: a number of first partitions along a first direction and a number of second partitions along a second direction of the first display terminal; and the first direction intersects the second direction;

the determining a screen partition result of the first display terminal according to at least one of a size of a first screen and a first resolution of the first display terminal and at least one of a size of a second screen and a second resolution of the second display terminal comprises:

determining a first parameter and a second parameter according to the size of the first screen and the size of the second screen, wherein the first parameter is used to reflect a screen size ratio of the first display terminal and the second display terminal in the first direction, and the second parameter is used to reflect a screen size ratio of the first display terminal and the second display terminal in the second direction;

determining a third parameter and a fourth parameter according to the first resolution and the second resolution, wherein the third parameter is used to reflect a pixel ratio of the first display terminal and the second display terminal in the first direction, and the fourth parameter is used to reflect a pixel ratio of the first display terminal and the second display terminal in the second direction;

determining a first partition parameter of the first display terminal according to the first parameter and the third parameter; determining a second partition parameter of the first display terminal according to the second parameter and the fourth parameter; and determining a first partition number and a second partition number according to the first partition parameter and the second partition parameter.

* * * * *